May 11, 1943.  H. DREYFUS  2,318,679
PRODUCTION OF ARTIFICIAL FILAMENTS, FILMS, AND LIKE MATERIALS
Filed July 18, 1941
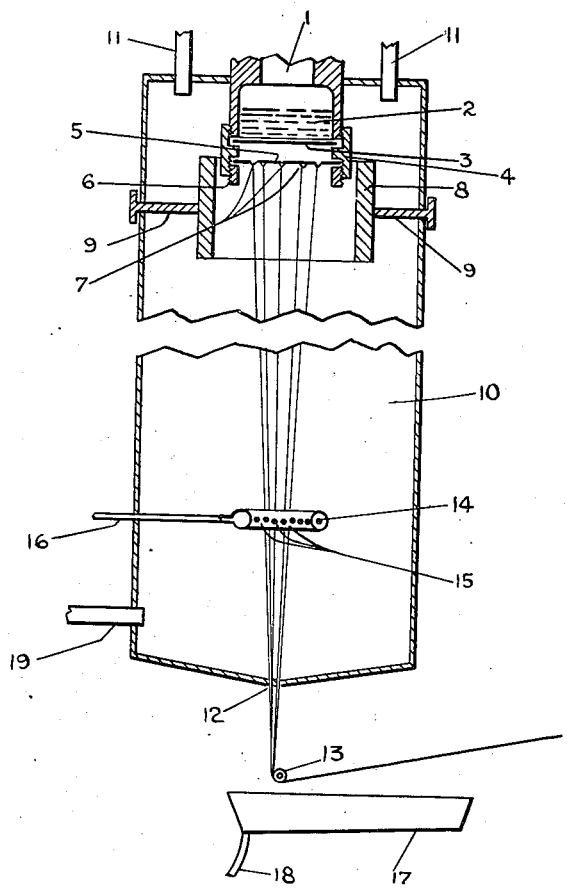
INVENTOR.
HENRY DREYFUS.
BY
ATTORNEYS.

Patented May 11, 1943

2,318,679

UNITED STATES PATENT OFFICE 2,318,679

PRODUCTION OF ARTIFICIAL FILAMENTS, FILMS, AND LIKE MATERIALS

Henry Dreyfus, London, England, assignor to Celanese Corporation of America, a corporation of Delaware Application July 18, 1941, Serial No. 402,941
In Great Britain August 5, 1940

4 Claims. (Cl. 18—54)

This invention relates to the production of artificial filaments, films and like materials and more particularly to the production of artificial textile and like materials having a basis of synthetic thermoplastic materials of high molecular weight.

It has recently been found that synthetic film- or fibre-forming substances may be produced by the union of the residues of the molecules of one or more reagents, each containing two reactive groups in the molecule, by the condensation of a reactive group of one molecule with a reactive group of another molecule, water, hydrochloric acid or a similar substance being eliminated during the reaction. Synthetic substances or polymers of this nature may be formed, for example, by condensing diamines with dicarboxylic acids, with halogen derivatives of hydrocarbons, with disulphonic acids, or with glycols, by condensing amino-carboxylic acids, amino-sulphonic acids or amino-halides with themselves or with each other, by condensing diacid-amides with diacids, and so forth. By a suitable choice of reagents, it is possible to produce substances with long chain molecules of high molecular weight, which can be converted by suitable methods into fibres or films. Preferably, reagents are chosen which have no substantial tendency to condense with formation of cyclic compounds. This may be achieved by selecting the reagents in such a way that the "unit length" of the resulting polymer consists of more than 6 atoms in a chain, and preferably more than 7 atoms. In the case of condensing diamines with dicarboxylic acids, for example, the unit length is arrived at by adding the number of atoms joining the two nitrogen atoms in the diamines, plus 2, to the number of atoms joining the carboxylic groups in the dicarboxylic acids plus 2.

The film- or fibre-forming polymers resulting from such condensations may be formed into textile filaments, bristles, ribbons, films and like materials, and in order to do so it is frequently convenient to work at rather high temperatures, e. g. of the order of 200–300° C. For example, shaped articles may be formed from polymers or from solid solutions of polymers in appropriate solvents by shaping them in molten condition, but often the polymers or the solutions only become sufficiently fluid for extrusion or other shaping operation at temperatures of 200–300° C. At such temperatures, however, and even at somewhat lower temperatures than these, exposure of the polymer to gases containing oxygen is liable to lead to discolouration of the materials and this has led to a considerable amount of research to devise methods of shaping the polymers or their solutions under oxygen free conditions. However, the mere isolation of the hot materials from oxygen does not meet all the difficulties which arise in shaping such materials. If the polymers are maintained at high temperatures for a substantial length of time, they tend to become degraded, with consequent change in solubility characteristics, and reduction in melting point and in viscosity so that the materials produced are of reduced value as textile and like materials.

I have now found that artificial textile and like materials may advantageously be produced from a composition formed by incorporating with a polymer of the type described above one or more solvents therefor in such a proportion that the composition is fusible at a temperature which does not substantially exceed 120 or 130° C. or at most 160° C., but which is solid at temperatures up to about 35° C., and preferably up to about 50° C. Particularly useful compositions are such as are fusible at temperatures which do not substantially exceed 60–100° C. Compositions of this class may be shaped, e. g. by extrusion through suitably shaped orifices, at temperatures of the order of 160° C. or below, and since at such temperatures there is no great tendency to degradation and only a slight tendency to discolouration or other modification under the influence of oxygen-containing gases, the shaping operation may be carried out with considerably less elaborate precautions than are necessary at the temperatures which have been employed hitherto.

Suitable solvents for the purposes of the present invention may be either liquid or solid at ordinary or slightly elevated temperatures, i. e. at temperatures of about 40° C. or below. Among such solvents which are particularly suitable for use in conjunction with polymeric amides, produced for example by condensing a diamine with a dicarboxylic acid, are the phenols, e. g. monohydric phenols such as, for example, phenol itself, the cresols, the xylenols, and the naphthols, and dihydric phenols, of which resorcinol, catechol, quinol and orcinol may be mentioned as examples. Mixtures of phenols with each other or with other agents, e. g. with other solvents or with non-solvents such as, for example, toluene, the xylenes, ethyl benzene or other aromatic hydrocarbons, may be employed with a view to producing a solvent medium having a desired solvent power and melting point. Non-phenolic solvents, particularly aliphatic acids, e. g. formic acid, acetic acid and the halogen substitution products of these acids, may also be employed in the absence of phenols. Suitable mixed solvent media are, for example, 90–65% resorcinol/10–35% phenol.

The proportion of solvent which is employed in the compositions may be varied within wide limits according to the physical characteristics desired in the shaped materials, the limits being set by the necessity for fusion of the composition at moderate temperatures, and for its existence in the solid condition without displaying tackiness at ordinary temperatures or somewhat above these, e. g. up to about 40° C. In the production of filaments of high voluminosity, polymer compositions containing a high proportion, e. g. 60–70 or 75% or more of solvent may be employed; the removal of this agent from the shaped materials after setting is found to give highly voluminous products. On the other hand, when voluminosity is not particularly desired, the proportion of solvent agent may be reduced as far as possible so that there is economy in the total amount of agents and in the subsequent washing operation which may be necessary.

The compositions for use according to the present invention may be prepared, for example, by making a comparatively dilute solution of the polymer in the desired solvent, e. g. a 20–30% solution, and concentrating this to the desired degree by evaporation, preferably under vacuum. In carrying out such an evaporative step, it is advantageous to maintain the composition in the fluid condition throughout, and to proceed immediately to the shaping operation without allowing the composition to solidify. Dilute solutions suitable for this method of producing the compositions may be obtained directly from the process of preparation of the polymer, e. g. polymerisation may take place in a high proportion of a solvent which is solid at ordinary temperatures, and the resulting composition may be concentrated as desired. Alternatively, the compositions may be made by carrying out the polymerisation in the proportion of solvent desired in the final composition, or in a smaller proportion and subsequently adding solvent to bring the concentration of polymer to the desired value. Another method by which the compositions may be produced comprises the treatment of the polymer in granular or flake form with a solution or dispersion in water or other known solvent from which the polymer takes up the desired amount of solvent. Such a solution or dispersion may be applied, for example, as a bath or as a spray. In carrying out the spinning operation when artificial filaments are to be produced according to the present invention, the composition may be fused, e. g. during passage through a narrow tube as described in U. S. application S. No. 375,762 filed January 24, 1941, and extruded under pressure applied, for example, by means of a liquid vapour or gas through suitable shaping orifices. Alternatively the extrusion pressure may be applied directly by means of a pump, for example the spinning may be carried out according to the process of U. S. application S. No. 375,761 filed January 24, 1941. The actual extrusion operation may take place while the composition is maintained at a temperature slightly above its fusion point, e. g. up to 10° C. above that point, so that when working according to the present invention it is unnecessary to raise the composition to a temperature substantially in excess of 160° C.

In carrying out shaping processes in accordance with the present invention it is advantageous to introduce the shaped materials directly from the shaping device into an inert gaseous or vaporous atmosphere, which, in the neighbourhood of the shaping device, is preferably heated to a temperature of the order of that of the shaped composition, and, after a short period of travel in the said atmosphere, e. g. 0.1, 0.25 or 0.5 second or more, during which, in general, setting of the materials will have commenced, to subject the materials to the action of an inert medium maintained at a temperature substantially lower than that of the materials so as to effect a rapid cooling of the materials. Preferably the relatively cool medium is a liquid medium.

The temperature of the relatively cool medium should be sufficiently low to permit completion of the setting of the shaped materials while under its influence, and is preferably at least 50° and may be 100°, 120° or 150° C. or even more below that of the shaped materials at the time when they encounter this medium. Thus, the cool medium may be maintained, for example, at a temperature of 0° C. or less.

When employing a liquid medium for completing the setting of the shaped materials it may be in the form of a bath, through which the materials are passed during their travel to a collecting device. However, it is generally preferred to apply such a liquid medium by a method which does not involve introducing the materials into a bath of the medium and so does not substantially lower the speed of travel of the materials. Thus, for example, the shaped materials may be sprayed, e. g. from an atomiser, with the liquid while they are passing through a chamber filled with the heated gas or vapour into which they pass from the shaping device, the materials meeting the spray at a distance from the shaping device sufficient to give the desired period of travel at high temperature. The spray may be directed to move with the materials or against them or may be directly transversely to their direction of travel. Alternatively or in addition, one or more rollers adapted to forward the materials and, if desired, the collecting device may be sprayed with the liquid. Again, the medium may with advantage be applied by irrigating one or more forwarding rollers and, if desired, a collecting roller with it.

Preferably an aqueous medium is employed as the medium by which setting is completed, though various organic liquids, e. g. alcohols, ethers, esters, hydrocarbons and chlorinated hydrocarbons may be employed. Advantageously the medium has no substantial tendency to extract the solvent constituents of the shaped materials, and with this in view a particularly suitable medium is, therefore, an aqueous solution of a salt, e. g. an alkali chloride, in such concentrations that the solvent constituents of the materials are substantially insoluble therein. The presence of the salt also reduces the freezing point of the medium and so permits lower temperatures to be employed. Other agents adapted to reduce the freezing point may be employed, e. g. glycol and glycerol.

When a gaseous or vaporous atmosphere is employed as the relatively cool medium it may be circulated to flow co- or counter-current along the line of travel of the shaped materials, being introduced or withdrawn from a cell through which the materials pass at a point removed from the shaping device by a distance sufficient to give the desired period of travel in the hot atmosphere in the neighbourhood of the shaping device. Alternatively the cool atmosphere may pass across the line of travel of the materials. The apparatus described in my U. S. application S. No. 382,007 filed March 6, 1941, may readily be adapted for use in carrying out this modification of the present invention.

It will be evident that no evaporation of any constituent of the shaped compositions is necessary, and consequently it is unnecessary to employ a closed reception chamber specially adapted for the recovery of volatile agents, though it is desirable to shield the shaped materials from uncontrolled currents in any medium with which they contact before completion of setting. After passage through an appropriate length of the setting medium, the extruded materials may be wound up, e. g. on a bobbin, and treated to free them as desired from the solvents present. This may be achieved, for example, by washing the materials while wound on a perforated bobbin with water, an aromatic hydrocarbon, e. g. benzene, toluene or xylene, or an aliphatic hydrocarbon, especially a low-boiling hydrocarbon, e. g. low-boiling petroleum ether. Washing may also be carried out with alkali solutions when the solvent is an acidic compound, e. g. a phenol; for example, dilute aqueous caustic soda may be employed. In order to free the shaped materials from all the solvent content, it may be necessary to heat the materials with a washing liquid but this should not be done until a substantial proportion of the solvent has been removed by cold washing, so that any risk of damage to the products due to softening may be minimised.

During the setting of the materials or, preferably, after they have been fully set, or during and after setting, they may be subjected to tension so as to stretch them with a view to reducing their denier and to increasing their tenacity. For example, after setting they may be drawn out, optionally while moist with water or other hydroxylic compound, to 200 or 300 up to 450% or more of their original length. Stretching may with advantage be carried out continuously with the setting of the materials with a cool liquid medium while they are still moist with that medium, when it has an appropriate composition.

Reference has been made above to polymers produced by certain specific reactions but it is to be understood that the invention is not limited to products of these particular reactions. It may be applied in general to polymeric products formed and/or stabilised.

Shaped materials according to the invention may have the form of filaments, yarns, films, foils or other shaped articles formed by extrusion or like methods, and the filamentary products may be converted, if desired, into staple fibre, for example by cutting methods. If desired, various effects may be produced in the articles by modifying the composition of the fused material to be extruded. Such effect materials may be, for example, high-boiling softening agents, which are preferably insoluble in the inert non-solvent medium, pigments, dyes and the like. Such effect materials may be introduced into the reaction mixture before polymerisation takes place, or during polymerisation, or after completion of the polymerisation. In addition to such effect materials, the characteristics of the products may be modified by incorporating in the fused materials one or more other thermoplastic substances, for example organic derivatives of cellulose, e. g. cellulose acetate, cellulose acetopropionate, cellulose acetobutyrate, cellulose stearate or cellulose acetostearate. Such additional thermoplastic materials may, in particular, modify the dye affinity of the products as well as the general physical characteristics thereof.

The accompanying drawing illustrates somewhat diagrammatically apparatus suitable for use according to the invention in the production of filaments and is described with reference to its operation.

A feed pipe 1 serves to deliver molten composition from a gear pump and source of supply (not shown) through a series of closely packed fine wire gauze filters 2, held in position by re-inforcement 3 and a collar 4 to a spinnerette 5 held in position by a collar 6. The spinnerette is provided with a number of conical projections 7, each having a small orifice at its apex. An annular member 8, supported by rods 9 adapted to be moved vertically in substantially gas-tight slides in the walls of the spinning chamber 10, carries electric heating coils which serve to maintain the face of the spinnerette at a desired temperature. Molten composition is extruded from the spinnerette into a heated atmosphere in the chamber 10 supplied through leads 11 and the resulting filaments are withdrawn through the outlet 12 round a guide 13 by a take-up roller (not shown). During their passage from the spinnerette to the outlet 12, the filaments are sprayed with cool liquid from an annular ring 14 having orifices 15 fed through the line 16. Liquid falling from the filaments and the conical shaped base of the chamber is collected in a trough 17 and withdrawn through line 18. The line 19 serves for withdrawal of the heated atmosphere for re-use if desired.

The following examples illustrate the invention:

Example I 100 parts by weight of recrystallised hexamethylene diammonium adipate and 120 parts by weight of commercial phenol are heated together for 8 hours at 190° C. under an atmosphere of nitrogen while allowing water which is formed to escape from the reaction vessel. There is then added to the melt 0.5 part by weight of adipic acid, and heating is continued for a further 10 hours under the same conditions. The product is then transferred to an electrically heated vessel and is brought to a temperature of 100° C. The base of the vessel carries a narrow tubular lead through which the molten material is conveyed to a gear pump and so through a series of closely packed fine wire gauze filters to a conical jet, the whole length of lead from vessel to jet being electrically heated to ensure uniform temperature of the materials. The jet face is also maintained at a temperature of 100° C. by being closely surrounded by an electrical heating coil. The extruded materials are received in air at a temperature of 80° C. and, after a travel of about 10 cms., are sprayed with a 16% aqueous sodium chloride solution at −10° C. and then fed by a roller, which is irrigated with the same solution, to a collecting device. The collected filaments are subsequently washed with water, first at 45° C. and then at 90° C., and are drawn down to four times their length to yield products of good elasticity and tenacity.

Example II 100 parts by weight of recrystallised hexamethylene diammonium adipate, 40 parts by weight of commercial phenol and 60 parts by weight of resorcinol are heated together for 8 hours at 190° C. under an atmosphere of nitrogen while allowing water which is formed to escape from the reaction vessel. There is then added to the melt 0.5 part by weight of adipic acid, and heating is continued for a further 10 hours under the same conditions. The product is then transferred to an electrically heated vessel and is brought to a temperature of 65° C. The base of the vessel carries a narrow tubular lead through which the molten material is conveyed to a gear pump and so through a series of closely packed fine wire gauze filters to a conical jet, the whole length of lead from vessel to jet being electrically heated to ensure uniform temperature of the materials. The jet face is also maintained at a temperature of 65° C. by being closely surrounded by an electrical heating coil. The extruded materials are received in air at a temperature of 55° C. and, after a travel of about 10 cms., are sprayed with a 16% aqueous sodium chloride solution at −10° C. and then fed by a roller, which is irrigated with the same solution, to a collecting device. The collected filaments are subsequently washed with water at 45° C. and are drawn down to four times their length to yield products of good elasticity and tenacity.

Having described my invention, what I desire to secure by Letters Patent is:

1. Process for the production of artificial textile and like shaped materials, which comprises shaping a fused composition comprising a synthetic thermoplastic fibre- or film-forming polyamide, which in the absence of other agents requires a temperature of the order of at least 200° C. for shaping in the molten condition, and a solvent medium therefor in such proportions that the composition is fusible at a temperature which does not substantially exceed 100° C., but is solid at temperatures up to 35° C., the said shaped composition being introduced directly from a shaping device into an inert atmosphere maintained at a temperature of the order of that of the shaped composition, and, after a short period of travel therein and while still in said inert atmosphere, subjected to the action of an inert liquid medium maintained at a temperature at least 50° C. below that of the shaped materials at the time when they encounter it.

2. Process for the production of artificial textile and like shaped materials, which comprises shaping a fused composition comprising a synthetic thermoplastic fibre- and film-forming polyamide, which in the absence of other agents requires a temperature of the order of at least 200° C. for shaping in the molten condition, and a phenol in such proportions that the composition is fusible at a temperature which does not substantially exceed 100° C., but is solid at temperatures up to about 35° C., the said shaped composition being introduced directly from a shaping device into an inert atmosphere maintained at a temperature of the order of that of the shaped composition, and, after a short period of travel therein and while still in said inert atmosphere, subjected to the action of an inert liquid medium maintained at a temperature at least 50° C. below that of the shaped materials at the time when they encounter it.

3. Process for the production of artificial textile and like shaped materials, which comprises shaping a fused composition comprising a synthetic thermoplastic fibre- or film-forming polyamide, which in the absence of other agents requires a temperature of the order of at least 200° C. for shaping in the molten condition, and a phenol in such proportions that the composition is fusible at a temperature between 60 and 100° C., the said shaped composition being introduced directly from a shaping device into an inert atmosphere maintained at a temperature of the order of that of the shaped composition, and, after a short period of travel therein and while still in said inert atmosphere, subjected to the action of an inert liquid medium maintained at a temperature at least 50° C. below that of the shaped materials at the time when they encounter it.

4. Process for the production of artificial textile and like shaped materials, which comprises shaping a fused composition comprising a synthetic thermoplastic fibre- or film-forming polyamide, which in the absence of other agents requires a temperature of the order of at least 200° C. for shaping in the molten condition, and a solvent medium therefor in such proportions that the composition is fusible at a temperature which does not substantially exceed 100° C., but is solid at temperatures up to about 35° C., the said shaped composition being introduced directly from a shaping device into an inert atmosphere maintained at a temperature of the order of that of the shaped composition, and, after a short period of travel therein and while still in said inert atmosphere, subjected to the action of brine maintained at a temperature at least 100° C. below that of the shaped materials at the time when they encounter it.

HENRY DREYFUS.